United States Patent [19]

Naito et al.

[11] 4,128,394

[45] Dec. 5, 1978

[54] TUNNEL KILN FOR USE IN REBAKING CARBONACEOUS MOLDINGS IMPREGNATED WITH TAR, PITCH OR THE LIKE

[75] Inventors: Kiyoshi Naito, Urawa; Akio Sukuya, Kawagoe, both of Japan

[73] Assignee: Shinagawa Refractories Co., Ltd., Tokyo, Japan

[21] Appl. No.: 773,654

[22] Filed: Mar. 2, 1977

[30] Foreign Application Priority Data

Feb. 8, 1977 [JP] Japan .................................. 52-12118

[51] Int. Cl.² .............................................. F27B 9/26
[52] U.S. Cl. .................................... 432/137; 432/145; 432/146; 432/192
[58] Field of Search ............... 432/136, 137, 145, 146, 432/192

[56] References Cited

U.S. PATENT DOCUMENTS

| 2,983,022 | 5/1961 | Dressler et al. | 432/137 |
| 4,050,880 | 9/1977 | Naito et al. | 432/192 |

Primary Examiner—John J. Camby
Attorney, Agent, or Firm—Brady, O'Boyle & Gates

[57] ABSTRACT

A tunnel kiln for use in rebaking carbonaceous moldings impregnated with tar, pitch or the like, consisting of a preheating zone, a baking zone and a cooling zone, which comprises providing arch shafts in the kiln ceiling, providing a plurality of gas recirculating devices communicating with said arch shafts and heating gas blow-in holes of the lower portion of side wall in the preheating zone and the baking zone, and further providing, above the heating gas passages or combustion chambers mounted on a number of connected kiln cars, muffles consisting of receiving plate, bottom plate, holder, cover having in its upper surface a number of tar gas discharge openings, and seal, which muffles accommodating said moldings to be rebaked.

5 Claims, 7 Drawing Figures

TUNNEL KILN FOR USE IN REBAKING CARBONACEOUS MOLDINGS IMPREGNATED WITH TAR, PITCH OR THE LIKE

This invention relates to a tunnel kiln for use in rebaking carbonaceous moldings which were impregnated with tar, pitch or the like in liquid after baking green carbonaceous moldings.

Carbon products are manufactured normally in such manner that carbonaceous body as base material is mixed with pitch, tar or resin as binder, and it is moulded by extruding or moulding process to become final product through such processes as baking to bond binder with the carbonaceous body, graphitizing to make said body a graphitic structure and finishing by machining.

These days, as means of improving the quality of carbon products there is added one process in which the pores of moldings to be baked are impregnated with organic substance such as pitch and tar between baking process and graphitizing process, thereby rebaking them.

According to conventional system, such rebaking is carried out in that moldings to be rebaked which were impregnated with liquid tar, pitch or the like after baking thereof as described above, are arranged within ceramic or metal muffles, filled with coke breeze or the like so as to externally surround the moldings and heated by heat conduction through the layers of muffle walls and coke breeze from outer surfaces of said muffles.

However, such conventional rebaking equipment has various kinds of drawbacks as described hereunder.

(1) The moldings to be rebaked are heated by only the heat conduction through the layers of the muffle walls and the coke breeze so that the moldings generate temperature difference, resulting in cracking.

(2) To effect a uniform heating for coping with the cracking it is required to increase the baking time and make the temperature gradient in muffles gentle. This not only lowers the heat efficiency of tunnel kiln but also reduces the baking capacity.

(3) It is required to increase the temperature difference between heating atmosphere temperature and the moldings to be rebaked due to lower heat transmission coefficient. This causes damage of muffles and kiln.

(4) There increases heating mass such as muffles and coke breeze other than the moldings to be rebaked, lowering the heat efficiency of the tunnel kiln.

(5) In view of the construction of tunnel kiln the heating mass increases in the lower portion rather than in the upper portion so that inevitably the temperature rise at the lower portion of said moldings to be rebaked delays in the temperature zone below 570° C. where a uniform temperature rise is required. Further, in some cases the central portions in height particularly delay in temperature rise according to kiln construction or heating method.

(6) Not to mention the handling operations of coke breeze a number of labor must be taken even for the removal operation of the coke breeze solidly adhered to the rebaked moldings.

(7) Muffles are deformed and broken at large extent owing to thermal expansion of the contents thereof so that baking cost becomes very high.

The invention of this invention could eliminate the above various drawbacks of conventional equipment and developed a novel method wherein rebaking is possible at lower cost and with high efficiency, to file a patent application (see Japanese Patent Publication No. 40886/76). In this method moldings to be rebaked are arranged in metal muffles and heating is made by supplying the heating source of the moldings to be rebaked and the muffles to the lower portions of said muffles. This method is characterized in that the gushing-out tar in liquid from the moldings by said heating is gathered in receiving plates within the muffles, and the inside of said muffles is retained at non-oxidizable atmosphere by means of the tar gas evaporated from the liquid tar and the tar gas evaporated directly from the moldings to be rebaked, thereby preventing said moldings from oxidation and effecting baking on the basis of heat conduction by tar gas as heating medium. Said inventors have, however, found the following disadvantages and demerits in carrying out said invention.

(1) Heating gas recirculation is made only in a preheating zone where the temperature of moldings to be rebaked is lower than 450° C., and a baking zone is heated only by heating method which heats lower portion by combustion through kiln burners. In the tunnel kiln of the system of said prior invention, the baking temperature of moldings to be rebaked is about 650° C. so that the fuel consumption in the baking zone is greatly diminished, but only with the combustion by kiln burners temperature control is difficult, generating local heat to give had influence upon the moldings to be rebaked as well as to greatly oxidize and damage bottom plates of said muffles.

(2) Due to large mono-length of a molding to be rebaked, the effective height of kiln is increased and the atmosphere of kiln car portion within the kiln becomes negative pressure and therefore, air enters into the kiln from the voids at the connecting portions of kiln cars. With only the very small amount of combustion gas through burners it is impossible, in baking zone, to avoid air entry from the connecting portions of the kiln cars under positive pressure which occurs at the heating gas passages in the upper portion of the kiln cars by the blowing-in of heating gas, which is one of the heating gas recirculation effects in preheating zone.

(3) In the baking zone where the temperature of moldings to be rebaked is in the neighborhood between 450° C. and 570° C. tar gas generates, and in the case of less amount of atmosphere gas within the kiln in the baking zone, tar gas content proportion of said gas increases, even flow rate of said gas in the kiln is retarded, and moreover, $O_2$ concentration of the atmosphere gas in the kiln is enhanced by the entry air from the connecting portions of said kiln cars, involving dangers of irregular combustion and explosion in the kiln.

(4) The gas glow in the kiln is in accordance with a system in which the hot gas in said baking zone is successively conveyed in the inlet side of the kiln, recirculating it in the preheating zone by heating gas recirculating means, and is exhausted at low temperature section of said preheating zone.

The object of this system is to guide into burning furnace the tar gas contained in the atmosphere gas within the kiln, to burn-out said tar gas by heating at a temperature in the range 800° to 850° C. with auxiliary burners for tar burning and to utilize the high temperature gas as a heating source in the preheating zone, thereby preventing air pollution caused by tar gas. Since the total amount of exhaust gas is exhausted at the inlet portion of the kiln in this case, the gas to be burned-out which is guided into said burning furnace at the low temperature side of said preheating zone, is low in temperature and becomes maximum in gas amount. Accordingly there are increased both the fuel consumption of auxiliary burning and the amount of high temperature gas generated. Said high temperature gas is used as a heating source in only the temperature area where tar gas may not be generated from moldings to be rebaked, but it is larger in amount than required heating gas so that part of it is directly exhausted from said burning furnace without being effectively recirculated.

(5) The tar gas gushed out of discharge holes of muffles is guided outside the kiln from gas suction holes of ceiling portion, together with the atmosphere gas in the kiln.

The gas suction holes are mounted in the preheating zone only, however, the tar gas evaporated in the baking zone of more than about 450° C. flows in the direction of said preheating zone, mixing with the atmosphere gas in the kiln, and is guided outside the kiln from the gas suction holes in the preheating zone. In this case, in the neighborhood of the boundary between said preheating zone and said rebaking zone, not only the tar gas content in the atmosphere gas within said kiln increases to enhance the danger of combustion in the kiln, but also there is lost balance between the tar gas amount and auxiliary burning fuel, and the air amount for burning, making the operations of kiln and burning furnace instable.

(6) Heating gas passage and combustion chamber are provided at the upper portion of kiln car, muffle construction is made at further upper portion thereof, and moldings to be rebaked are arranged within said muffle. The cars with muffles and moldings are carried into the kiln to effect baking said moldings with successive movement of the kiln cars, but the heating gas blown in by gas ejection pipes during the travel of said kiln cars, and the burner flames, bump against column bricks constituting said heating gas passage to be dispersed in upper and lower directions along both the side surfaces of said kiln cars. Not only this unnecessarily heats both the side surfaces of the kiln cars but also it becomes impossible during such operation to retain the heating gas passages on the cars under positive pressure, permitting the air entry into the kiln from the lower portion of said kiln cars. As a result there occur various problems such as increased danger of combustion within the kiln, lowering heat efficiency and unsafe operation of the kiln.

The present invention has been made for the purpose of eliminating the demerits of said known invention, and it is characterized as follows:

(1) The atmosphere gas flow within the kiln according to the present invention is divided in the following system.

It is capable of fixing a diversion point of the atmosphere gas in the kiln by providing a plurality of gas recirculating devices in the ceiling portion of said preheating zone and baking zone and by the correlation in the axial direction of the kiln, between the suction hole position of the atmosphere gas in said kiln, which is provided in the ceiling portion, and the blow-in hole position of the heating gas, which is amounted in the lower portions of both the side walls.

Reasonable heating and effective use of heat in the preheating zone becomes possible by a balance between the heat amount demanded by the heating source for the heating in said preheating zone, and the total heat volume of tar gas as a heating source and auxiliary burners for tar burning-out, and by a balance between exhaust gas amount and the air amount for combustion and burning-out, which is supplied into the burning-out furnace of tar gas, further it is possible the prevention of environmental pollution.

(2) In the cooling process in cooling zone and the exhausting process of atmosphere gas within the kiln, oxidation of the moldings to be rebaked takes place if oxygen-rich gas enters into muffles in case the temperature of said moldings is more than 450° C., so that attention must be paid.

The present invention is of the construction in which the combustible waste gas at high temperature which is fed from a baking zone to a cooling zone, passing through the kiln, is cooled by diluting it with cooling air which is fed from the outside of the kiln or with gas, but said air never enters directly into muffles.

(3) According to the kiln of the present invention, in the preheating, baking and cooling zones there are carried out gas recirculatings of their own respective objects, but the present kiln is also characterized by respective zone controls in the gas recirculations in said preheating zone and said rebaking zone where tar gas generates from the moldings to be rebaked.

To collect, at each zone of the respective gas recirculating devices, the tar gas discharged from the upper portions of muffles into the spaces of said ceiling, said ceiling is provided with arch shafts for gas collection in the ceiling portion.

The tar gas discharged from the interior of muffles is exhausted together with the atmosphere gas within the kiln, outside the kiln, from discharge holes provided in the ceiling portion and communicating with the gas recirculating devices connected each zone. If partial or almost all tar gas containing the atmospheric gas in said kiln pass throughout the kiln without being sucked and is discharged into the air from the discharge openings arranged in the inlet of the kiln and the cooling zone, however, there are given bad influences such as lowering of effective recycled heat not to mention environmental pollution.

The tar gas gushed out from muffles into the ceiling spaces runs together with the atmosphere gas in the kiln toward both the inlet of the kiln and the cooling zone, at the diversion point of gases as boundary. Since arch shafts are provided over the entire width of kiln ceiling the tar-gas-containing atmosphere gas in the kiln rises up into said arch shafts, ensuring the guidance of said atmosphere gas into burning furnace. In the flow direction of the atmosphere gas in the kiln, the ascending gas flow from heating gas passages on the kiln cars becomes major stream in tar-gas-generating zone, and therefore the tar-gas-containing atmosphere gas in the ceiling portion never descends.

(4) It is possible only through the split travel system of kiln cars of the present invention to ensure achieving the method wherein heating gas is supplied to the heating gas passages on the kiln cars, the heating gas passages are maintained under positive pressure and the air entry from the lower portions of the kiln cars is shut off.

The "Split Travel System of Kiln Cars" herein referred to is one where the whole number of heating gas passages of the cars coupled in the kiln are constructed so as to be in regular interval, and heating gas blow-in holes or burner holes in the lower portion of side walls are arranged correspondingly to said heating gas passages. Further, each kiln car moves in short time at an interval of one pitch of the heating gas passage, and the kiln cars are kept in a stationary state during most part of baking operation.

The invention will now be described further in detail, by way of example, with reference to the accompanying drawings, in which.

Figure 1:
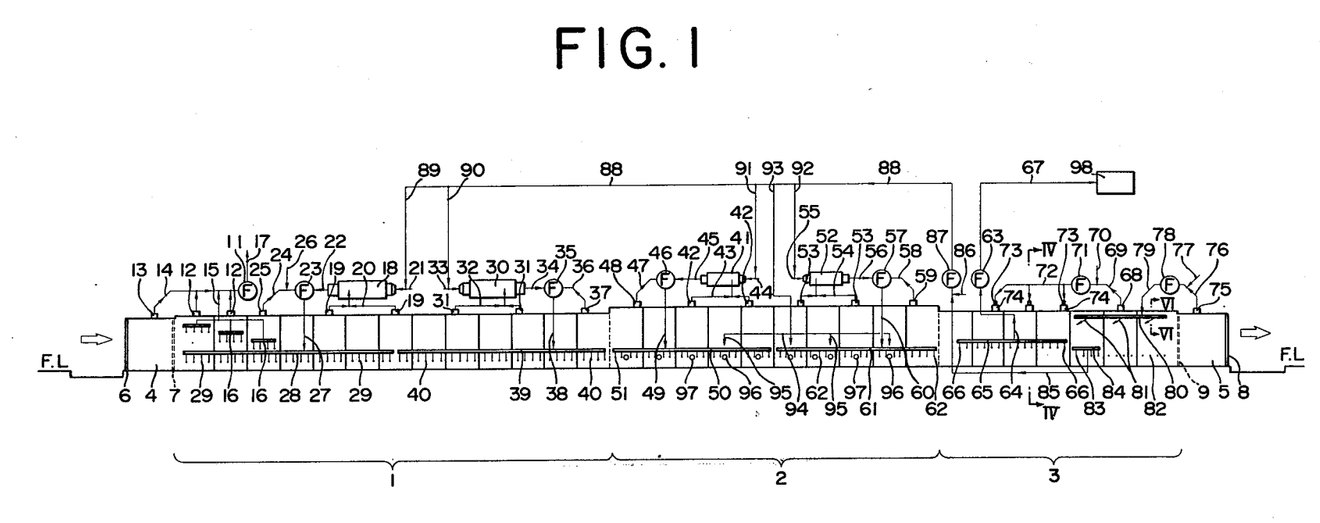
FIG. 1 is a side view of the whole tunnel kiln of this invention, showing a relationship amoung a preheating zone, a baking zone, a cooling zone, respective heating and cooling gas recirculating devices, tar gas burning furnace and the arrangement of burners.

In FIG. 1, reference numeral 1 indicates a preheating zone, reference 2 a baking zone, reference 3 a cooling zone, numeral 4 an inlet chamber, and numeral 5 an outlet chamber respectively, thereby constituting the main body of the tunnel kiln. Numeral 6 is an outer door for said inlet chamber, reference 7 an inner door for same, reference 8 an outer door for said outlet chamber and numeral 9 an inner door for the same.

Reference 11 shows an exhaust fan, reference 12 arch shafts for exhausting gas in the preheating zone, reference 13 an arch shaft for exhausting gas in the inlet chamber, reference 14 an exhaust duct communicating the exhaust fan 11 with the arch shafts 12, 13, reference 16 exhaust manifolds of side wall portions, and reference 15 an exhaust duct communicating said manifolds 16 with said exhaust duct 14 respectively. Numeral 17 is an exhaust flue guiding exhaust gases into chimney.

Numerals 18, 30 show burning-out furnaces for tar gas in the preheating zone and numerals 19, 31, 37 arch shafts for collecting the atmosphere gas in the kiln, which contains tar gas, numeral 25 is an arch shaft for collecting the atmosphere gas in the kiln, which does not contain tar gas, references 20, 32 show suction ducts communicating said arch shafts 19, 31 with said burning-out furnaces 18, 30, and references 21, 33 auxiliary burners for tar burning-out of the burning-out furnaces 18, 30 respectively. References 23, 35 indicate recirculating fans in the preheating zone, references 22, 34 suction ducts communicating said burning-out furnaces 18, 30 with said recirculating fans 23, 35, numerals, 24, 36 suction ducts communicating said arch shafts 25, 37 with said recirculating fans 23, 35, and numeral 26 is a cold air suction duct. References 27, 38 represent discharge ducts of heating gas in the preheating zone, references 28, 39 header ducts of side wall portions, and numerals 29, 40 ejection pipes for emitting heating gas into heating gas passages on the kiln cars respectively.

Numerals 41, 52 represent tar gas burning-out furnaces in the rebaking zone, numerals 42, 48, 53, 59 arch shafts for collecting gases in the baking zone, numerals 43, 54 suction ducts communicating said arch shafts 42, 53 with said burning-out furnaces 41, 52, and references 44, 55 auxiliary burners for tar burning furnace 41, 52. References 46, 57 show recirculating fans in the rebaking zone, references 45, 56 suction ducts communicating said burning-out furnaces 41, 52 with said recirculating fans 46, 57, references 47, 58 other suction ducts communicating said arch shafts 48, 59 with said recirculating fans 46, 57.

Numerals 49, 60 are discharge ducts of heating gas in the baking zone, reference 50, 61 header ducts on side wall portions, and numerals 51, 62 ejection pipes to emit heating gas into the heating gas passages on the kiln cars.

Reference 63 is an exhaust fan for the exhaust gas in said baking zone and the collected hot air in said cooling zone, reference 65 an exhaust gas duct, numeral 64 a suction suction duct communicating said duct 65 with said exhaust fan 63, and reference 66 an exhaust pipe for hot gas respectively. Reference 98 represents a preheating furnace for carbonaceous moldings, which is used in tar-impregnating equipment, and reference 67 a discharge duct communicating said exhaust fan 63 with said preheating furnace 98.

Reference 68 shows an arch shaft for collecting gas in the cooling zone, reference 71 a recycle fan in the cooling zone, reference 69 a suction duct communicating said arch shaft 68 with said recirculating fan 71, and numeral 70 another suction duct for cold air. Numeral 73 is ejection nozzles for cooling gas, numeral 72 a discharge duct communicating said recirculating fan 71 with said discharge pipes 73, and numeral 74 arch shafts for gas recirculating which are provided with said ejection nozzles 73.

Numeral 75 is an arch shaft for collecting gas in the outlet chamber, numeral 78 a cooling fan, numeral 76 a suction duct communicating said arch shaft 75 with said cooling fan 78, numeral 77 another duct for sucking cold air, numeral 80 a header duct for ejecting cold air, reference 79 a still another discharge duct communicating said cooling fan 78 with said header duct 80 respectively. Reference 81 collectively shows cold air ejection nozzles 81a, 81b which will be referred to below. Reference 82 is a suction hole for the open air.

Numeral 84 represents a header pipe for sucking hot air in the kiln, numeral 83 a suction pipe communicating with said header pipe 84, numeral 87 an air fan for combustion, numeral 85 a suction duct communicating said fan 87 with said header pipe 83, and reference 86 a cold air duct respectively.

References 89, 90, 91, 92 denote auxiliary burners for tar burning-out, references 21, 33, 44, 55 combustion air ducts, and reference 88 denotes a discharge duct communicating each said duct with said fan 87 respectively. Numerals 96, 97 show kiln burners mounted correspondingly to the heating gas passages on the upper portion of kiln cars, and numerals 93, 94, 95 are ducts for supplying combustion air, which respectively communicate said kiln burners 96, 97 with said discharge duct 88.

Figure 2:
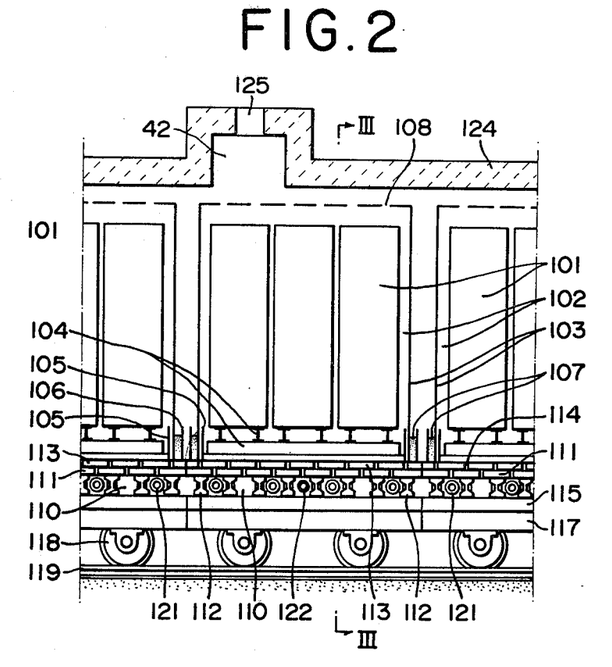
FIG. 2 is an enlarged detail sectional view of the baking zone of FIG. 1, showing kiln cars, muffle structure, heating gas passages, arch shaft, heating gas blow-in holes, positions of the burners, etc.
Figure 3:
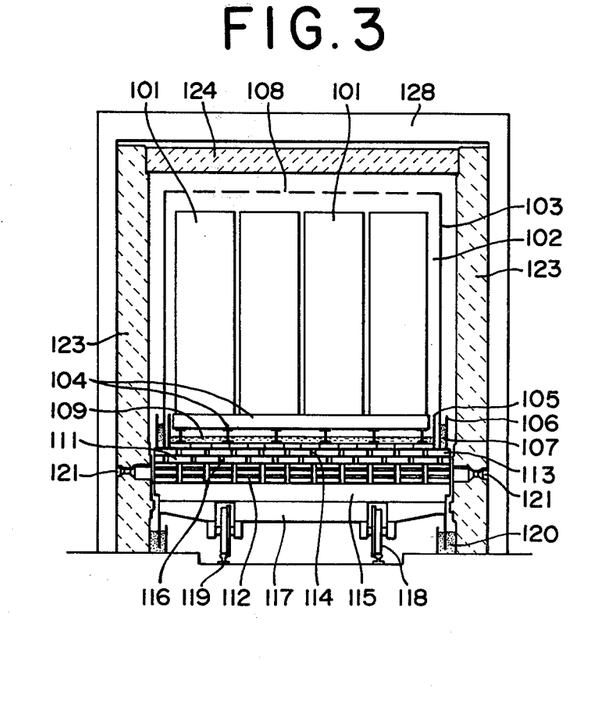
FIG. 3 is a sectional view taken along the line III—III of FIG. 2, showing a relationship among kiln car, muffle structure, heating gas passage, side walls, ceiling, etc.

In FIGS. 2 and 3, reference numeral 101 denotes moldings to be rebaked, reference 102 gas convection spaces in maffle, reference 103 a cover, reference 104 a holder for arranging said moldings 101, reference 105 receiving plate for liquid tar, reference 106 a bottom plate, and reference 107 a sealing material, respectively. Each muffle structure consists of covers 103, holder 104, receiving plate 105, bottom plate 106 and sealing material 107, and moldings to be rebaked are arranged in the muffle. Numeral 108 is tar gas discharge hole at the upper portion of said cover, and reference 109 tar in liquid.

Reference 117 shows a kiln car, reference 115 bricks of said kiln car, numeral 113 holder bricks, numeral 112 column bricks, numeral 111 cover bricks, and numeral 110 a heating gas passage or a combustion chamber, the heating gas passage being constituted by said cover bricks 111, said column bricks 112 and said car bricks 115.

Reference 116 denotes gas upward holes which are peripheral spaces of the cover bricks, and reference 114 horizontal gas passages which are peripheral spaces of the holder bricks 113.

Numeral 118 shows a wheel of the kiln car 117, numeral 119 a rail, numeral 120 a sand seal, numeral 121 a blow-in hole for heating gas, numeral 122 a burner hole, numeral 123 a side wall, reference 124 a ceiling, numeral 125 a discharge hole for the atmosphere gas in the kiln and it being mounted in the arch shaft 42, and numeral 128 a steel frame of the kiln.

Figure 4:
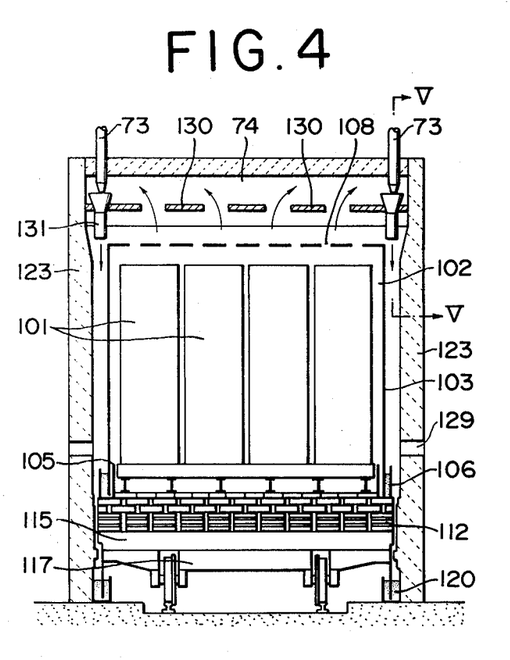
FIG. 4 is an enlarged detail sectional view of the section taken along the line IV—IV of FIG. 1, showing a cooling gas flow within the kiln.
Figure 5:
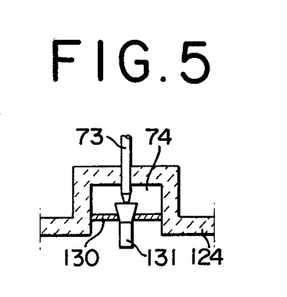
FIG. 5 is a sectional view taken along the line V—V of FIG. 4.

Referring to FIGS. 4 and 5, numeral 73 ejection nozzles for cooling gas, numeral 74 an arch shaft, numeral 130 a baffle which ascends the gas within the kiln into the arch shaft approximately equally over the entire length of the kiln, said baffle being arranged with a space at the lower portion within the arch shaft, reference 131 mixing pipes, reference 129 a hot gas discharge hole communicating with the hot gas exhaust pipe 66.

Figure 6:
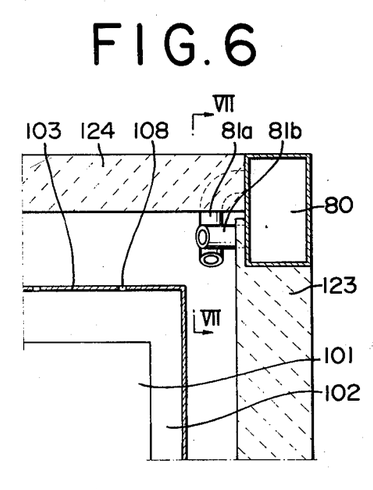
FIG. 6 is an enlarged detail view partly in section of the section taken along the line VI—VI of FIG. 1, showing a relationship between cold air nozzles and said muffle structure.
Figure 7:
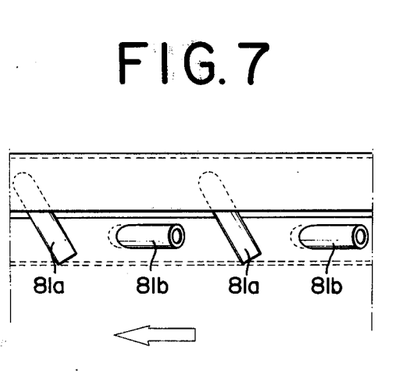
FIG. 7 is a sectional view taken along the line VI—VI of FIG. 6, showing the direction of cold air nozzle and showing the traveling direction of kiln cars with arrows.

Referring to FIGS. 6 and 7, numerals 81a, 81b represent ejection nozzles.

Said ducts and pipes are equipped with dampers for controlling air quantity.

The equipment of the present invention consists of the above parts. In order that the invention may be more clearly understood some functions thereof will be described with reference to the accompanying drawings.

On the upper portion of said car bricks 115 there are constructed a heating gas passage or a combustion chamber 110 with cover bricks 111 and column bricks 112, the cover bricks 111 being arranged to form the upward holes for heating gas, and the column bricks 112 are arranged with a space being provided to communicate with the neighboring heating gas passage or combustion chamber 110.

On the upper surface of said cover bricks 111 there are arranged the holder bricks 113 with a space constructed to flow the heating gas right and left. At the more upper portion thereof there is deposited a bottom plate 106, and horizontal gas passages 114 are constructed at the periphery of the holder bricks 113 by combination of said bottom plate 106 and said holder bricks 113.

The heating gas (in the preheating and backing zones) is suppled from a heating gas blow-in holes 121 or a burner holes 122 provided at the lower portion of side wall 123, or the burning flames (in the rebaking zone), rise up to a horizontal gas passage 114 through the heating gas passage or combustion chamber 110 on kiln car bricks 115 and through the heating gas upward hole 116, continue to move right and left at said passage 114 to heat bottom plate 106, and further ascend along the space portion between upward cover 103, and side wall 123 and neighboring cover, to reach the ceiling.

A receiving plate 105 for liquid tar is set above a bottom plate 106, making a space with said bottom plate. Said space is provided more to uniformly heat a receiving plate 105 and liquid tar 109 in the receiving plate, which are heated through said bottom plate 106. Within the receiving plate 105 there is deposited a holder 104 upon which moldings 101 to be rebaked are arranged. A cover 103 is set on said bottom plate 106 so as to cover said moldings 101, holder 104 and receiving plate 105, and the clearance constituted by the cover 103 and the bottom plate 106 is sealed by a sealing material 107.

Heating from the lower portion of said bottom plate 106 raises the temperature of said receiving plate 105. In the temperature range of the moldings 101 to be rebaked between room temperature and about 200° C., liquid tar gushes out in a very small amount, but in this temperature range said moldings 101 may not be oxidized so that it is unnecessary to maintain the interior of muffle in nonoxidizable atmosphere and heating is made by convectional heat conduction based on residual air.

However, the residual air in the muffles gradually changes into non-oxidizable atmosphere owing to the tar gas generated according to temperature rise.

When the temperature of the moldings 101 to be rebaked becomes higher than 200° C., part of the tar ingredient previously impregnated gushes out of said moldings 101 to flow down to and stay at the interior of said receiving plate 105.

Said liquid tar 109 within the receiving plate 105 is heated from the lower portion of the receiving plate to evaporate to become tar gas, and the tar gas continues to ascend, heating the moldings 101. The tar gas which has been lowered in temperature is condensed and again flown down into the receiving plate 105. The heat conduction for which tar is thus a heat medium is carried out in the temperature range of said moldings 101 to be rebaked between about 200° C. and about 550° C. In this case, if the gas pressure within the muffles becomes higher than that of the atmosphere in the kiln the tar gas gushes out outside the muffles from tar gas discharge holes 108 bored at the upper portion of said cover 103.

In this case, the bottom plate 106 portion becomes the maximum temperature portion of the kiln. If tar gas gushes out from portion of the sealing material 107 of muffle, therefore, the tar gas may burn at said portion to bring about a local overheating and it becomes incapable of regulating temperature-rising curve so that tar gas leakage from said sealing member material 107 must be prevented.

Accordingly, the tar gas generated within muffles must all be discharged from tar gas discharge holes 108 of the cover 103 and guided outside the kiln from discharge hole 125 for the atmosphere gas in the kiln, which is provided at the arch shaft portion of said ceiling.

Sieved river sands are employed as sealing material 107 but other materials may be substituted for the sands.

When the temperature of the moldings 101 to be rebaked reaches higher than about 550° C., most of the liquid tar 109 within said receiving plate 105 evaporate to leave distilled coke. In the baking zone where the temperature of said moldings 101 is in the range of about 570° C.- about 700° C. and in the cooling zone where that is in the range of about 700° C. - about 450°

C., tar gas does not generate within muffles, but even if air entered into muffles from tar gas discharge holes 108 in the upper portion of the cover 103, the oxidizable gas may not oxidize the moldings 101 to be rebaked, by reacting with the distilled coke strayed within said receiving plate 105, because the distilled coke is comparatively rich in reactivity. This has experimentally been found.

The distilled coke quantity is finally about 1.5% of the weight of a molding 101 to be rebaked, and the coke can be collected for re-use.

Rebaking of the moldings 101 is effected in such manner that a kiln car having aforementioned heating gas passage or combustion chamber 110 is mounted with a muffle construction within which moldings 101 to be rebaked are arranged, and the kiln car travels within the tunnel kiln, adjusting in order each communicating position at every movement and rebaking the molding. That is, the heating gas passages or combustion chamber 110 are constructed in such manner that in a state where a number of kiln cars are connected in the kiln, the arranging pitch dimensions of the cars are same over the entire length of the kiln. In addition, there are mounted also in the same pitch dimensions as those of said heating gas passages or combustion chambers 110 on the kiln cars, heating gas ejection pipes 29, 40, 51, 62, kiln burners 96, 97, suction pipe 83 and open-air suction hole 82.

The atmosphere gas flow in said tunnel kiln is in counter current against the advance direction of kiln cars in the preheating zone 1; in concurrent in the baking zone 2; and in the cooling zone 3 the flow is in concurrent within the range where the temperature of said moldings is higher than about 400° C. but in counter current within the lower temperature range below 400° C.

The heating in said preheating zone 1 is carried out only by the burning heat of tar gas volatilized from said moldings 101 in said zone and by the heat source of auxiliary burners 21, 33 for tar burning-out.

The heating gas which is ejected heating gas from ejection pipe 40 into the heating gas passage or combusion chamber 110 on kiln car, heats the bottom plate 106 of muffle and rises up from the muffle periphery to reach the ceiling. Further, the heating gas mixes in the ceiling portion with the tar gas discharged from the interior of the muffle and horizontally runs in the ceiling to ascend to arch shafts 31, 37. In case kiln atmosphere gas gathers at the arch shaft portions the gas flow in the ceiling portion may be not only in counter current but also partly in concurrent on some occasions.

The gas to be burned-out containing tar gas discharged outside the kiln from arch shaft 31 is guided into burning-out furnace 30 through duct 32 and burned by the combustion flames of auxiliary burner 33 for tar burning-out, to become a high temperature clean gas. The combustion air supplied from duct 90 into the auxiliary burner 33 will be enough in quantity for fuel combustion and tar gas burning. The same thing can be said with regard to other burning furnaces 18, 41 and 52.

In order that tar gas be burned within said burning furnace 30, it is required to retain the temperature at 800° to 850° C. Since the tar gas content ratio of the gas to be burned is in the range 1–3%, however, temperature maintenance is impossible without auxiliary burners for tar burning-out. The same thing goes for other burning furnaces 18, 41 and 52.

As the burning furnace 30 has a heat exchange function, the temperature of hot clean gas when the gas reached the suction side of fan 35 is raised up to 700° to 750° C., and the gas to be burned is preheated by the temperature difference with the interior of the burning furnace.

The high temperature clean gas arrives at fan 35 through duct 34 and is again supplied, as heating gas, to the heating gas passage or combustion chamber 110 on kiln car through duct 38, header duct 39 and ejection pipe 40. In this instance it is necessary to control temperature as a heating gas. In order that the kiln atmosphere gas be maintained in low oxygen content in the high temperature area of said preheating zone, the atmosphere gas is diluted without using air but by sucking the gas within the kiln, which contains tar gas, from arch shaft 37 through duct 36. Accordingly, the temperature-controlled heating gas contains tar gas, but this gas mixture continues to recirculate within the kiln until the tar gas contained therein is completely burned-out in burning furnace 18 at the low temperature side in the preheating zone, causing no air pollution at all.

The function of the gas recirculating device at the low temperature area in said preheating zone is similar to the aforementioned system, but difference lies in the diluting method of heating gas and the gas exhausting.

The gas to be burned which was sucked into burning furnace 18 through duct 20 from arch shaft 19, is burned-out in said burning furnace 18 and sucked into fan 23 through duct 22. As a gas for dilution there is sucked the atmosphere gas within the kiln through duct 24 from arch shaft 25, but the present invention is equipped also with duct 26 which sucks the air outside the kiln. In the embodiment shown in the drawings the temperature of moldings 101 to be rebaked is below 200° C. in the distance between arch shaft 19 of the kiln inlet side and the kiln inlet portion, so that tar gas does not generate. Moreover, since the zone where heating gas is supplied from header duct 28 is not a temperature area where combustion trouble within the kiln occurs, the air outside kiln may be used for dilution, and any oxygen increase in the heating gas may not give any bad influence.

The reason of equipping with both the ducts 24 and 26 for diluting the heating gas is, in one way, to make the temperature control of said heating gas easier, and in the other way, to make treatment possible by lifting the tar gas to the interior of arch shaft 19 in the kiln inlet side by closing the damper of duct 24 if tar gas is generated near said arch shaft 19.

The heating gas amount supplied from discharge pipe 29 is exhausted by 30 to 40% in the preheating zone 1, and the remaining 60 to 70% is again sucked in the burning furnace 18. The exhaust gas is sucked into discharge fan 11 through ducts 14, 15 from exhaust manifold 16 in side wall and arch shaft 12, and exhausted from exhaust flue 17.

Arch shaft 13 is to collect and discharge the gas within said kiln, which gushes into inlet chamber 4 out of the preheating zone 1.

In the preheating zone 1, the moldings 101 to be rebaked are thus heated up to about 450° C.

The heating in said baking zone 2 is carried out by the heat sources of heating gas recirculation and kiln burner 96, 97. The object of using two kinds of heating sources resides in that with only the kiln burners 96, 97 the heating becomes local heating to bring about an oxidation erosion of bottom plate 106 and with only the heating gas the heating capacity will not be sufficient.

The atmosphere gas within the kiln, which contains tar gas risen to arch shaft 42, is guided into burning furnace 41 through duct 43, is burned out by auxiliary burner 44 to become a high temperature clean gas, and reaches fan 46 through duct 45. The heating gas whose temperature has been controlled by the kiln atmosphere gas for dilution which has been sucked by arch shaft 48 and duct 47, is supplied into said heating gas passage or combustion chamber 110 on the kiln car through fan 46, duct 49, header duct 50 and discharge pipe 51.

The generating amount of tar gas in the high temperature area of said baking zone 2 is so small that the role of burning furnace is not only burning-out but also used as means of regulating heat volume of heating gas, when the fuel proportion becomes higher than those of other burning furnaces 18, 30, 41.

The atmosphere gas within the kiln, which contains tar gas guided into burning furnace 52 through arch shaft 53 and duct 54, is burned by auxiliary burner 55, becomes a high temperature clean gas and sucked into fan 57 through duct 56. On the other hand, the atmosphere gas for dilution within the kiln, which is sucked from arch shaft 59 and duct 58, does not contain tar gas at all so that the temperature-controlled heating gas is supplied, as clean heating gas, into the kiln through duct 60 communicating with fan 57, header duct 61 and discharge pipe 62.

Even in the baking zone 2 the atmosphere gas within the kiln is maintained in low oxygen content used for diluting high temperature clean gas and therefore, the interior of said kiln is atmosphere. Further, since it is possible to maintain a little higher than the atmospheric pressure the atmosphere pressure of said heating gas passage or combustion chamber 110 on the kiln car by the heating gas supplied by ejection pipes 51, 62, it will greatly contribute for the maintenance of atmosphere, too, that air does not enter into the kiln from the contact portions of inter-cars and the sand seal 120.

Discharge pipe 62 is constructed in such manner that heating gas is supplied up to the lower portion of the arch shaft 59 in said cooling zone 3 side, of kiln burner 96 in the high temperature side. This prevents, by gas sealing, the oxygen-rich gas from passing, from the cooling zone 3 into the baking zone 2, through the clearance of column bricks 112 on kiln car and the clearance at both sides of said kiln car, and also ensures a stablization of maintaining the maximum temperature (in the neighborhood of arch shaft 53) of said baking zone 2.

The gas flow within the kiln is made counter current in the preheating zone 1 and concurrent in the baking zone 2. As a result of the separation in two directions, the gas flow rate in the horizontal direction within the kiln becomes approximately half. According to the tunnel kiln of the present invention, the atmosphere gas within the kiln is to flow in the space surrounded by cover 103, both side walls 123 and ceiling 124, but principally the side portion of said cover 103 is in upward current and the upper portion thereof in horizontal current. The section area of the ceiling space increases by arch shafts 12, 25, 19, 31, 37, 48, 42, 53, 59 mounted in the ceiling 124, so that the gas flow rate in the horizontal direction will be delayed.

According to one embodiment of the present invention, the gas flow rate is about 0.45–0.75 m/sec. in the neighborhood of the arch shaft 19, 53, but it becomes about 0.15–0.25 m/sec. in the arch shaft 19, 53 portions.

Thus the ascending flow rate in arch shaft, of the atmosphere gas in the kiln which is sucked outside the kiln becomes nearly same as the horizontal gas flow rate in the ceiling portion in said arch shaft, so that the tar gas in the zones which are shared by each of arch shafts 19, 31, 37, 48, 42, 53 can certainly be sucked in each of said arch shafts. Heating gas recirculating control, including tar gas treatment, is thus possible in each zone partitioned by each of the arch shafts 19, 31, 37, 48, 42, 53 and therefore, it becomes easy to maintain the baking temperature and it is possible to avoid partial increase of tar gas content proportion of the kiln atmosphere gas, thereby settling the troubles such as combustion and explosion in the kiln by tar gas.

The gas flow within the kiln in said cooling zone 3 is made by combination of concurrent with counter current. The kiln gas flowing out in the low temperature area of said cooling zone 3 toward outer door 8 in the kiln inlet, is discharged by cooling fan 78 through duct 76 from arch shaft 75. At the suction side of said fan 78 is provided a cold air suction duct to make a construction where it is possible to control the gas temperature of said fan 78 system, but practically the cold air suction amount is more than the exhaust gas amount.

The cooling gas (50–80° C.) discharged from ejection nozzles 81a, 81b into said ceiling and spaces of side wall through cooling fan 78, duct 79 and header duct 80, is discharged making a counter current thereto to prevent the gas within kiln from natural flowing toward outlet chamber 5 of the kiln.

As moldings 101 to be rebaked are not oxidized in the cooling zone 3 where the temperature of said moldings 101 is below 400° C., it is possible to eject, as a cooling gas, oxygen-rich gas onto the upper portions of muffles.

The cooling gas discharged from ejection nozzles 81a, 81b continues to mix with the kiln gas to effect cooling and is sucked from arch shaft 68 into recirculating fan 71 in the cooling zone through duct 69. At the suction side of said fan 71 is provided a cold air suction duct 70, and it is capable of controlling the gas temperature of the fan 71 system.

The cooling gas (100°–150° C.) downwardly discharged from cooling gas ejection nozzle 73 into the kiln through recirculating fan 71 in the cooling zone and duct 72, downwardly flows by its ejection force a high temperature exhaust gas flowing into the cooling zone 3 from the baking zone 2, and concurrently mixes said two gases, whereby effecting cooling with said mixture of lowered temperature. At arch shaft 74 there are provided a baffle 130 and an ejection nozzle 73, and at the position opposite to said nozzle is provided a mixing pipe 131. The gas within kiln whose short passing has been controlled by said baffle 130, ascends within the arch shaft 74 nearly equally over the entire length of the kiln, and descends within the space between cover 103 and side wall 123 by ejecting action by the cooling gas discharged from said mixing pipe 131 and nozzle 73. Said gases are sucked by exhaust fan 63 through hot gas exhaust hole 129 mounted in said side wall 123, discharge pipe 66, header duct 65 and duct 64, and then transmitted to a preheating furnace 98 through discharge duct 67. However, part of the flowndown gas lifts up to flow into arch shaft 74 and recirculate in the kiln again by ejecting action.

Since cooling is thus possible in the cooling zone 3 where the temperature of moldings 101 to be rebaked is above 400° C. without ejecting oxygen-enriched cooling gas onto the upper portions of muffles, oxygen-enriched gas hardly enters from the tar gas exhaust holes in the upper portion of said cover 103. Moreover, since the distilled coke remaining in liquid tar receiving plate 105 with muffle is rich in reactivity compared with the moldings to be rebaked, oxidation of said moldings does not occur at all.

According to the tests of the present tunnel kiln, cooling effect through cooling fan 78 is made only in the muffle construction portion, and the brick constructions (111, 112, 113, 115) on kiln car 117 will be short in cooling. Because of this, by providing an open-air suction hole 82 in the side wall 123 of low temperature area of said cooling zone 3, and further by providing combustion air fan 87, duct 85, header pipe 84 and suction pipe 83, there is effected cooling of the brick constructions (111, 112, 113, 115) on said kiln car 117. In the car portion the pressure within kiln being negative, cold air is sucked into the kiln from said open-air suction hole 82, and it flows in the high temperature side (baking side) direction, passing through the spaces between column bricks 112 on the kiln car, and is sucked from suction pipe 83 for use as combustion air.

Air may enter from the connecting portions of kiln cars because in the cooling zone 3 cooling gas is not blown into heating gas passage 110 on the kiln car, but said air is to contribute for cooling the brick constructions on said kiln car 117.

At the suction side of combustion air fan 87 is provided a cold air duct 86 where temperature control of the fan 87 system is possible.

The discharge side of said combustion air fan 87 is communicated with discharge duct 88, combustion air ducts 89, 90, 91, 92 and combustion air supplying ducts 93, 94, 95, to supply combustion air to auxiliary burners 21, 35, 44, 55 and kiln burners 96, 97.

Thus by effecting cooling and heat volume recovery in the cooling zone 3 the thermal efficiency of the kiln is improved, and by recovering the exhaust gas in said baking zone 2 and approximately 55% of the whole cooling heat volume it is possible use the total heat volume for the preheating furnace 98 of tar impregnating equipment, ensuring about 65% economization of the required heat volume in said preheating furnace 98.

The total heat volume of exhaust gas in the cooling zone, which is usable for said preheating furnace 98 of the tar impregnating equipment, is 60 to 70% of the heat volume required in said furnace 98 in case the capacity of the kiln is made same as that of the tar impregnating equipment, and the temperature of the exhaust gas is from 250 to 300° C. In this case it results in that the temperature of the exhaust gas in said cooling zone is lower than that required for the preheating furnace 98, but it is capable of obtaining a required temperature in the range 350–450° C. by adding high temperature combustion gas by about 35% which is short as heat volume. The tunnel kiln for rebaking carbonaceous moldings and the tar impregnating equipment are in inseparable relation so that the method of using exhaust heat in the kiln becomes possible, this achieving both the performance improvement of tunnel kiln and the saving of fuel consumption of both the equipments.

Being constructed as described above, the tunnel kiln of the present invention enjoys the following effects. (1) In the apparatus of the invention, by arranging gas recirculating device even in the baking zone the heating in the baking zone is effected by the mixed gases of the hot gases generated by kiln burner and of the recirculating gas. Therefore, the bottom plate can be prevented from oxidation erosion by local heating, the tar content of the atmosphere gas in said baking zone is relatively lowered, it is possible to prevent the air entering into the kiln from the lower portion of the car by means of the positive pressure produced in heating gas passage portion on said car even if pressure control means is not particularly provided, and there do not occur troubles such as combustion and explosion within the kiln because the heating gas is a low oxygen content gas after the burning-out of tar gas. (2) Exhaust gas in the baking zone is conveyed to the cooling zone side, recirculating within the kiln by gas recirculating device, and discharged outside of the kiln in the high temperature area at said cooling zone, thereby preventing air from entering into the baking zone from the cooling zone. Because of this, it is possible to avoid a combustion within the kiln, which occurs in said baking zone, and to uniformly heat the moldings to be rebaked in the maximum temperature zone. Further, the exhaust gas can also be used as a heat source of preheating furnace of tar impregnating equipment, which is pretreatment device for rebaking. (3) With arch shafts installed it results in that the effective sectional area of gas zones within the kiln increases, and the gas flow rate in horizontal direction in the arch shaft portions delays. Thus, in the sections of the arch shaft portions the upward flow of the atmosphere gas within the kiln is accelerated, and tar-gas-containing gases are exhausted from the arch shaft portions. Accordingly, the tar gas generated between said arch shaft portions and the arch shaft portions in the upper stream side of the gas flow, is certainly discharged outside of the kiln in each zone of gas recirculating device. Zone control becomes thus possible in tar gas discharge between arch shafts, and the tar gas no longer enters into other zones, avoiding the dangers such as combustion and explosion within the kiln. (4) The total amount of the exhaust gas discharged from the inlet side of the kiln is disposed of in a subsidiary burning furnace of the gas recirculating means in said preheating zone, and said heating gas thus disposed of contributes for the heating in the temperature zone near the kiln inlet, where tar gas does not generates, while the total exhaust gas discharged in the high temperature area of said cooling zone is gas either disposed of in the subsidiary burning furnace of gas recirculating device in said baking zone or passed through the high temperature area of said baking zone. Accordingly both the exhaust gases do not contain tar gas at all, not bringing about any environmental pollution such as air pollution.

Thus prevention of environmental pollution becomes possible by efficiently using the subsidiary burning furnace of gas recirculating means, and any independent exhaust gas disposing apparatus is no longer required, lowering construction cost as well as effectively using heat. (5) In the present invention, one pitch dimension of heating gas passage on the kiln car is in the range 250–350 mm. That is, the whole number of heating gas passages of respective cars connected in the kiln are constructed at regular interval, and the heating gas blow-in holes or burner holes beneath the side walls are arranged to correspond with said heating gas passages. Further, the kiln car is moved at short interval of time (such as about 10–30 sec.) per pitch of the heating gas passage, but the car is kept stationary during most part (98–99%) of the baking time. Accordingly, the time when the column bricks of the heating gas passages pass across the positions of said heating gas blow-in holes and burner holes, is very short compared with continuously mobile system, and therefore it becomes possible to smoothly supply heating source to heating gas passage or combustion chamber and to retain the heating gas passage under positive pressure, thereby avoiding irregular combustion within the kiln and erosion or damage of the lower portions of kiln car and muffle and achieving uniform heating of moldings to be rebaked.

What is claimed is:

1. A tunnel kiln for use in rebaking carbonaceous moldings impregnated with tar, pitch or the like, said tunnel kiln including a preheating zone, a baking zone and a cooling zone; arch shafts provided in the kiln ceiling, heating gas blow-in holes at the lower portion of the kiln side wall, a plurality of gas recirculating devices for feeding gas from the arch shafts in said preheating zone and baking zone to said blow-in holes, a plurality of connected cars movably mounted in said kiln, each car including passage means serving both as heating gas passages and combustion chambers; a muffle mounted on each car for accommodating said moldings to be rebaked, said muffle being disposed above said passage means, said muffle comprising a bottom plate, a tar-receiving plate mounted in said bottom plate, a holder mounted in said tar-receiving plate for supporting the moldings to be rebaked, a cover supported on said bottom plate to thereby enclose said moldings, holder and tar-receiving plate, a seal disposed between said cover and said bottom plate, and a plurality of tar gas discharge openings provided in the upper surface of said cover.

2. A tunnel kiln for use in rebaking carbonaceous moldings impregnated with tar, pitch or the like according to claim 1 wherein said gas recirculating devices include a tar gas burning furnace, an auxiliary burner for tar burning-out, a recirculating fan and suction and discharge ducts.

3. A tunnel kiln for use in rebaking carbonaceous moldings impregnated with tar, pitch or the like according to claim 1 wherein a baffle is provided at the lower portion within the arch shaft in the cooling zone, and there are provided a cooling gas ejection nozzle, and a mixing pipe extending downwardly from said ceiling portion into a space between both the side surfaces of said muffle and the side wall of the kiln.

4. A tunnel kiln for use in rebaking carbonaceous moldings impregnated with tar, pitch or the like according to claim 1 wherein all the heating gas passages in the kiln cars are constructed at regular intervals, and said heating gas blow-in holes or burner holes at the lower portion of the kiln side wall are arranged at the same intervals corresponding to said heating gas passages.

5. A tunnel kiln for use in rebaking carbonaceous moldings impregnated with tar, pitch or the like according to claim 1 wherein a hot gas exhaust pipe in the cooling zone and a preheating furnace of the carbonaceous moldings are communication with each other through exhaust ducts, suction ducts, discharge fans and discharge ducts.

* * * * *